United States Patent [19]

Kawada et al.

[11] 4,268,534

[45] May 19, 1981

[54] METHOD FOR PRODUCING HARD BUTTER

[75] Inventors: Tsukasa Kawada, Yachiyo; Yukitaka Tanaka, Funabashi, both of Japan

[73] Assignee: Kao Soap Company, Tokyo, Japan

[21] Appl. No.: 69,086

[22] Filed: Aug. 23, 1979

[30] Foreign Application Priority Data

Aug. 25, 1978 [JP] Japan ............................ 53-104204

[51] Int. Cl.[3] ............................................ A23D 5/00

[52] U.S. Cl. .................................. 426/607; 426/313

[58] Field of Search .............................. 426/607, 313; 260/405.6, 409

[56] References Cited

U.S. PATENT DOCUMENTS

| | | | |
|---|---|---|---|
| 2,667,418 | 1/1954 | Barsky et al. | 426/607 X |
| 2,685,592 | 8/1954 | Barsky et al. | 426/607 X |
| 2,979,407 | 4/1961 | Duck | 426/607 X |
| 3,595,673 | 7/1971 | Seiden | 426/607 |
| 4,006,264 | 2/1977 | Gooding | 426/607 |

*Primary Examiner*—Robert A. Yoncoskie

*Attorney, Agent, or Firm*—Birch, Stewart, Kolasch & Birch

[57] ABSTRACT

A method for manufacturing hard butter which comprises interesterifying an oil-and-fat material of about 20 to 40% by weight of myristic acid triglyceride and about 60 to 80% by weight of a vegetable oil, such as rapeseed oil, soybean oil or corn oil, or a hardened vegetable oil obtained by hydrogenating such a vegetable oil. The resultant hard butter has a good palatability and is free of a soapy taste.

13 Claims, No Drawings

METHOD FOR PRODUCING HARD BUTTER

BACKGROUND OF THE INVENTION

The present invention relates to a method for manufacturing hard butter from myristic acid triglyceride as an essential material. More particularly, the invention relates to a method for manufacturing hard butter of a novel type through a process of interesterifying an oil-and-fat material mixture of about 20 to 40 percent by weight of myristic acid triglyceride and about 60 to 80 percent by weight of a particular vegetable oil or hardened vegetable oil.

Hard butter is usually required to have a melting point that is approximately the temperature of the human body (that is, 32° to 38° C.) and also a suitable hardness at room temperature. Lauric hard butter, produced from coconut oil or palm-kernel oil, has a superior palatability and can be produced through a simple process, so that it has long been used as such. However, its use is limited by the possible generation of a soapy taste caused by the free fatty acids having carbon numbers of not more than 12, which are produced by the hydrolysis. On the other hand, oil-and-fat materials, obtained by hydrogenating a vegetable oil such as soybean oil or corn oil under such a condition that the trans-unsaturated fatty acid triglyceride content increases, or a solvent extract from such oil-and-fat material (commonly referred to as trans hard butter), is used more extensively because it is free from the generation of a soapy taste. However, the palatability and hardening speed of trans hard butter are inferior to lauric hard butter.

An object of the present invention is to provide a novel type of hard butter which has good palatability and is free from any soapy taste.

Other objects and advantages of the invention will become apparent to those skilled in the art from a consideration of the following specification and claims.

SUMMARY OF THE INVENTION

According to the present invention, hard butter is manufactured by a process which comprises interesterifying a mixture consisting essentially of about 20 to 40% by weight of myristic acid triglyceride and about 60 to 80% by weight of one or more vegetable oils selected from the group consisting of rapeseed oil, soybean oil and corn oil, or a hardened vegetable oil obtained by hydrogenating such a vegetable oil.

DESCRIPTION OF THE PREFERRED EMBODIMENTS

A preferred process for manufacturing hard butter in accordance with the present invention comprises the steps of;

(I) interesterifying an oil-and-fat material mixture of (i) about 20 to 40% by weight of myristic acid triglyceride and (ii) about 60 to 80% by weight of one or more vegetable oils selected from the group consisting of rapeseed oil, soybean oil and corn oil, and (II) hydrogenating the interesterified oil-and-fat material obtained in step (I) under the condition that the trans-unsaturated fatty acid triglyceride content thereof is increased as the major product until the melting point of the mixture reaches 34° to 40° C. The vegetable oils employed, namely rapeseed oil, soybean oil and corn oil, may be substituted partly by palm oil.

Another preferred process for manufacturing hard butter in accordance with the present invention comprises the steps of;

(I) hydrogenating one or more vegetable oils selected from the group consisting of rapeseed oil, soybean oil and corn oil under the condition that the trans-unsaturated fatty acid triglyceride content thereof is increased until the melting point reaches 34° to 40° C., and (II) interesterifying an oil-and-fat material mixture of (i) about 20 to 40% by weight of myristic acid triglyceride and (ii) about 60 to 80% by weight of the vegetable oil hydrogenated in step (I).

Preferably, the vegetable oil obtained by the hydrogenation of step (I) in the latter procedure contains at least 45% by weight of trans-unsaturared fatty acid triglycerides. The vegetable oil selected from the group consisting of rapeseed oil, soybean oil and corn oil or mixtures thereof may be substituted partly by palm oil.

The vegetable oil to be interesterified with myristic acid triglyceride, in accordance with the present invention, should be hydrogenated under the conditions prescribed above either prior to or after the interesterification, as noted in the two described alternative procedures.

According to the present invention, the proportion of myristic acid triglyceride in the mixture to be interesterified is limited to an amount no greater than about 40 percent by weight. This is because of the fact that although the manufacture of hard butter is possible with a proportion greater than 40 weight percent, undesirable fat bloom is liable to result when the resultant hard butter is used for chocolate manufacture, which is the main use of hard butter. A suitable range of the proportion of myristic acid triglyceride used is between 20 to 40 percent by weight of the fat material mixture. With an amount less than 20 weight percent it is impossible to obtain a desirable hard butter.

The vegetable oil to be interesterified with the myristic acid triglyceride is, as noted above, suitably one or more members selected from the group consisting of rapeseed oil, soybean oil and corn oil. The vegetable oil may be partly substituted by palm oil. Palm oil may be contained in an amount less than 50% by weight in the vegetable oil-palm oil blend. The proportion of the vegetable oil or vegetable oil-palm oil blend suitably ranges from about 60 to 80% by weight of the oil-and-fat material mixture to be interesterified.

It is well known in the art that rapeseed oil, soybean oil and corn oil are triglycerides of fatty acids. The main fatty acids constituting rapeseed oil are oleic acid, erucic acid and linoleic acid, those constituting soybean oil are oleic acid, linoleic acid and linolenic acid, and those constituting corn oil are oleic acid and linoleic acid. All of these are unsaturated fatty acids.

A desirable hard butter cannot be obtained by employing palmitic acid triglyceride or stearic acid triglyceride instead of myristic acid triglyceride. With the use of such fatty acid triglycerides constituted with $C_{16}$ to $C_{18}$ saturated fatty acids other than myristic acid triglyceride, the palatability and hardness of the hard butter manufactured therefrom are unsatisfactory, with the consequence that these triglycerides are inadequate as a hard butter material.

The interesterification can be carried out in the conventional manner as known in the art. It is conveniently carried out, for example, in the presence of a suitable catalyst, at a temperature of about 60° to 150° C. and under an inert gas such as a nitrogen stream.

Examples of the catalyst that can be used for the interesterification reaction are anhydrous basic substances, for instance, metallic sodium, metallic potassium or alkali metal alkoxides having no greater than four carbon atoms per molecule (for instance sodium methoxide and sodium ethoxide) and alkali metal hydrides such as sodium hydride and calcium hydride. The effectiveness of the catalyst and completion of the reaction can be readily determined from the change of color.

The hydrogenation can be conducted in the conventional way well known in the art. For example, in order to increase the trans-unsaturated fatty acid triglyceride content in the hard butter, the hydrogenation may be carried out at an elevated temperature and at a high pressure and in the presence of a suitable hydrogenation catalyst, for instance, a nickel catalyst poisoned with sulfur or a nickel catalyst supported on diatomaceous earth. Conveniently the hydrogenation is carried out at a hydrogen pressure of about 0.1 to 3 kg/cm$^2$, preferably 0.1 to 1 kg/cm$^2$, and at a temperature of about 160° to 220° C., preferably 200° to 220° C. Various hydrogenation catalysts other than those specifically mentioned above may be employed so long as they are compatible with the objectives of the present invention.

The amount of the catalyst for the interesterification and that for the hydrogenation is suitably selected and is advantageously from about 0.1 to 2 percent by weight with respect to the fat material mixture.

During the hydrogenation, the di- or tri-unsaturated fatty acids constituting rapeseed oil, soybean oil or corn oil are reduced partly to saturated fatty acids and partly to trans-mono-unsaturated fatty acids. Oleic acid, which is one of the main fatty acids constituting rapeseed oil, soybean oil and corn oil and which has a cis-mono-unsaturation, is partly hydrogenated to stearic acid and partly isomerized to the corresponding trans isomer, elaidic acid.

When the hydrogenation is carried out employing a nickel catalyst poisoned with sulfur or a nickel catalyst supported on diatomaceous earth, both hydrogenation and isomerization occur to increase the trans-unsaturated fatty acid triglyceride content.

The hydrogenation should be discontinued when the melting point of the product reaches 34° to 40° C., preferably to 36° to 38° C.

The hard butter obtained according to the present invention has an excellent quality without the possibility of giving rise to a soapy taste or fat bloom, and it provides a good palatability when used for chocolate manufacture.

EXAMPLES OF THE INVENTION

The following examples are given merely as illustrative of the present invention and are not to be considered as limiting. All of the percents in the examples are based on weight.

EXAMPLE 1

Myristic acid triglyceride and rapeseed oil were mixed together in the proportions shown in Table 1 below, and each sample thus obtained was subjected to interesterification by heating at 120° C. in a nitrogen stream and in the presence of 0.2 percent of sodium methoxide. After the interesterification, the resultant oil and fat was hydrogenated in the presence of 0.5%, based on said oil and fat, of a nickel catalyst poisoned with sulfur at a hydrogen pressure of 0.5 to 1.0 kg/cm$^2$ and at a temperature of 200° to 220° C. until the prescribed melting point of the product was reached. The analysis values of the hard butter thus obtained are shown in Table 1, and the solid fat indexes of the resultant hard butter samples are set forth in Table 2.

TABLE 1

| | Composition of material | | Analysis values of product hard butter | | |
|---|---|---|---|---|---|
| Sample No. | Myristic acid triglyceride | Rapeseed oil | Iodine value | Melting point | Transethylenically unsaturated acid* |
| 1. | 20% | 80% | 53.6 | 37.3 | 39.5 |
| 2. | 25% | 75% | 51.6 | 37.3 | 39.6 |
| 3. | 30% | 70% | 50.8 | 36.5 | 39.0 |

Note:
*Measured as elaidic acid by infrared absorption

TABLE 2

| | Solid fat index (SFI, according to Cd. 10-57, the U.S. Fat Association Code) | | | | | | | |
|---|---|---|---|---|---|---|---|---|
| Sample No. | 5° C. | 10° C. | 15° C. | 20° C. | 25° C. | 30° C. | 35° C. | 40° C. |
| 1. | 62.5 | 62.4 | 59.6 | 54.4 | 48.0 | 36.7 | 13.9 | 0 |
| 2. | 66.5 | 66.2 | 63.6 | 57.3 | 50.3 | 36.8 | 13.7 | 0 |
| 3. | 66.0 | 66.0 | 62.5 | 55.5 | 48.0 | 32.7 | 8.8 | 0 |

Chocolate having the following formulation was prepared from each of the sample Nos. 1 to 3 of hard butter in Table 1.

| Chocolate formulation | | |
|---|---|---|
| hard butter | 33 | parts by weight |
| chocolate liquor | 5 | " |
| cocoa powder | 10 | " |
| powdered skim milk | 15 | " |
| powdered sugar | 47 | " |
| lecithin | 0.3 | " |

The chocolate thus prepared was stored at 20° to 25° C. for a month. After this storage, absolutely no soapy taste or fat bloom was recognized, and the palatability thereof was very satisfactory.

EXAMPLE 2

65 Percent of selectively hydrogenated corn oil (with an iodine value of 71.0, a trans unsaturated acid content of 50.0 percent and a rising melting point (softening point) of 38.5° C.) and 35 percent of myristic acid triglyceride were interesterified in the usual way, for instance, as described in Example 1, to produce hard butter having an iodine value, a melting point and solid fat indexes (SFI) as shown in Table 3.

TABLE 3

| Sample No. | Iodine Value | Melting point | Solid fat index | | | | | | | |
|---|---|---|---|---|---|---|---|---|---|---|
| | | | 5° C. | 10° C. | 15° C. | 20° C. | 25° C. | 30° | 35° C. | 40° C. |
| 4 | 49.8 | 36.5° C. | 60.2 | 60.1 | 56.6 | 50.8 | 43.7 | 32.5 | 7.4 | 0 |

Chocolate having the same formulation as in Example 1 was prepared from the hard butter thus obtained. After the chocolate was stored at 20° to 25° C. for a month, absolutely no soapy taste or fat bloom was recognized, and the palatability thereof was very satisfactory.

EXAMPLE 3

55 Percent of rapeseed oil and 45 percent of palm oil were mixed together, and the resultant blended oil was subjected to selective hydrogenation in the usual way to obtain a hardened oil having an iodine value of 66.5 and a trans unsaturated fatty acid content of 52.0 percent. 75 percent of this hardened oil and 25 percent of myristic acid triglyceride were interesterified in the usual way to obtain hard butter having the characteristics as shown in Table 4.

TABLE 4

| Sample No. | Iodine Value | Melting point | Solid fat index | | | | | | | |
|---|---|---|---|---|---|---|---|---|---|---|
| | | | 5° C. | 10° C. | 15° C. | 20° C. | 25° C. | 30° C. | 35° C. | 40° C. |
| 5 | 49.8 | 36.5 | 60.2 | 60.1 | 56.6 | 50.8 | 43.7 | 32.5 | 7.4 | 0 |

The hard butter thus obtained had no soapy taste.

Chocolate having the same formulation as described in Example 1 was prepared from the hard butter thus obtained. After the chocolate was stored at 20° to 25° C. for one month, no fat bloom was noted and the palatability of the product was very satisfactory.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for manufacturing hard butter which comprises the steps of;
   (I) interesterifying an oil-and-fat material mixture comprising
      (i) about 20 to 40% by weight of myristic acid triglyceride, and
      (ii) about 60 to 80% by weight of at least one vegetable oil selected from the group consisting of rapeseed oil, soybean oil and corn oil, or a mixture of said vegetable oil and palm oil, and
   (II) hydrogenating the interesterified oil-and-fat material obtained in step (I) under conditions wherein trans-unsaturated fatty acid triglycerides are produced as the major product until the melting point of the mixture reaches 34° to 40° C.

2. The process of claim 1, wherein the amount of palm oil is less than 50% by weight in the vegetable oil-palm oil mixture.

3. The process of claim 1, wherein the interesterification is conducted under an inert gas and in the presence of an interesterification catalyst at a temperature of about 60° to 150° C.

4. The process of claim 3, wherein the interesterification catalyst is an anhydrous basic substance.

5. The process of claim 1, wherein the hydrogenation is conducted in the presence of a hydrogenation catalyst at a temperature of about 160° to 220° C.

6. The process of claim 5, wherein the hydrogenation catalyst is a nickel catalyst.

7. A process for manufacturing hard butter which comprises the steps of;
   (I) hydrogenating at least one vegetable oil selected from the group consisting of rapeseed oil, soybean oil and corn oil or a mixture of said vegetable oil and palm oil under conditions wherein the trans-unsaturated fatty acid triglyceride content is increased until the melting point reaches 34° to 40° C., and
   (II) interesterifying an oil-and-fat material mixture comprising
      (i) about 20 to 40% by weight of myristic acid triglyceride, and
      (ii) about 60 to 80% by weight of the hydrogenated vegetable oil obtained in step (I).

8. The process of claim 7, wherein the amount of palm oil is less than 50% by weight in the vegetable oil-palm oil mixture.

9. The process of claim 7, wherein the interesterification is conducted under an inert gas and in the presence of an interesterification catalyst at a temperature of about 60° to 150° C.

10. The process of claim 9, wherein the interesterification catalyst is an anhydrous basic substance.

11. The process of claim 7, wherein the hydrogenation is conducted in the presence of a hydrogenation catalyst at a temperature of about 160° to 220° C.

12. The process of claim 11, wherein the hydrogenation catalyst is a nickel catalyst.

13. Hard butter manufactured by the process of claim 1 or claim 7.

* * * * *